(No Model.)
A. G. LANGLOT.
CORN PLANTER ATTACHMENT.
No. 345,387. Patented July 13, 1886.
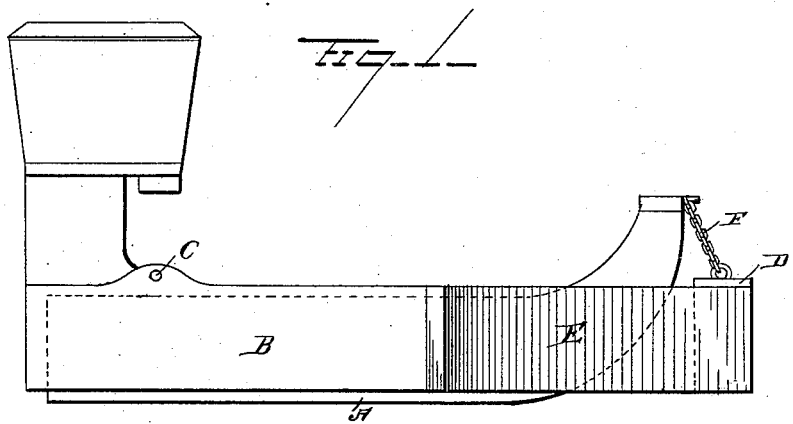
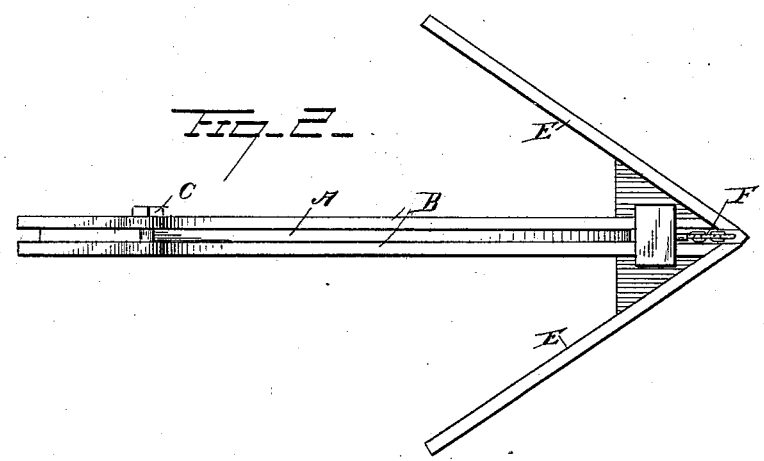
Witnesses
Wm. T. Gill
J. W. Garner
Inventor
Adam G. Langlot
By his Attorneys
C. A. Snow & Co.

UNITED STATES PATENT OFFICE.

ADAM G. LANGLOT, OF LA GRANGE, MISSOURI.

CORN-PLANTER ATTACHMENT.

SPECIFICATION forming part of Letters Patent No. 345,387, dated July 13, 1886.

Application filed April 27, 1886. Serial No. 200,358. (No model.)

*To all whom it may concern:*

Be it known that I, ADAM G. LANGLOT, a citizen of the United States, residing at La Grange, in the county of Lewis and State of Missouri, have invented a new and useful Improvement in Corn-Planter Attachments, of which the following is a specification.

My invention relates to an improvement in attachments for corn-planters; and it consists in the peculiar construction and combination of devices, that will be more fully set forth hereinafter, and particularly pointed out in the claims.

In the drawings, Figure 1 is a side elevation of my invention attached to the runner of a corn-planter. Fig. 2 is a top plan view of the same.

A represents the runner of a corn-planter of the usual construction.

B represents a pair of side bars, which are placed on opposite sides of the runner of the corn-planter, and are connected together at their rear ends by a transverse bolt, C, which bears above the top edge of the runner, and are connected together at their front ends by a block, D, the front edge of which is beveled on opposite sides. From the front ends of the bars B project diagonal wings E, which extend rearwardly and outwardly from the bars B. To the front end of the attachment is secured a suspending and elevating chain, F.

The operation of my invention is as follows: When the corn-planter is in operation, the front end of the attachment is lowered to the ground, causing the wings E to run in advance of the runner, and thereby effectually clear away clods, stones, weeds, and trash, and thus permit the seeds to be planted below the surface at all times, and enabling the runners to work evenly in the ground. When the attachment is not in use its front end is raised by drawing upwardly upon the chain F.

A corn-planter attachment thus constructed is cheap and simple, is very easily operated, is not likely to get out of order, and will be found of great utility by farmers in clearing away trash and clogs in advance of the runners.

Having thus described my invention, I claim—

1. The combination, with the runner of a corn-planter, of the bars B, projecting from the front side thereof and having the outwardly and rearwardly extending wings E at their front ends, and means for raising or lowering the front ends of the said bars and wings, substantially as described.

2. The attachment for corn-planters, consisting of parallel bars B, and the wings E, extending outwardly and rearwardly from the front ends of the said bars, substantially as described.

In testimony that I claim the foregoing as my own I have hereto affixed my signature in presence of two witnesses.

ADAM G. LANGLOT.

Witnesses:
CALEB G. YATES,
JOHN H. BROSI.